(12) United States Patent
Lan (10) Patent No.: US 7,032,922 B1
(45) Date of Patent: Apr. 25, 2006

(54) STROLLER WITH A DETACHABLE SEAT MEMBER

(76) Inventor: Red Lan, 15F, No. 108, Sec. 1, Hsin Tai 5th Rd., Hsichih, Taipei Hsien, Taiwan (TW)

( * ) Notice: Subject to any disclaimer, the term of this patent is extended or adjusted under 35 U.S.C. 154(b) by 0 days.

(21) Appl. No.: 11/133,791

(22) Filed: May 21, 2005

(30) Foreign Application Priority Data

Feb. 2, 2005 (CN) .................. 200520003600 U (51) Int. Cl.
*B62B 7/12* (2006.01)

(52) U.S. Cl. .................. 280/648; 280/647; 280/643

(58) Field of Classification Search .......... 280/642, 280/647, 643, 648, 650, DIG. 6, 31, 62, 30, 280/47.38, 47.4, 658, 47.41, 654, 639, 641; 297/256.17, 256.16, 256.15, 183.4, 183.3, 297/183.2, 377, 16.2
See application file for complete search history.

(56) References Cited

U.S. PATENT DOCUMENTS

| | | | |
|---|---|---|---|
| 5,718,439 A * | 2/1998 | Wang ..................... 280/47.38 |
| 5,772,279 A * | 6/1998 | Johnson, Jr. .............. 297/130 |
| 5,820,144 A * | 10/1998 | Wang ..................... 280/47.38 |
| 5,865,447 A * | 2/1999 | Huang ........................ 280/30 |
| 5,947,555 A * | 9/1999 | Welsh et al. ............... 297/130 |
| 6,086,086 A * | 7/2000 | Hanson et al. ............. 280/650 |
| 6,241,274 B1 * | 6/2001 | Huang ....................... 280/642 |
| 6,250,654 B1 * | 6/2001 | Willis ..................... 280/47.41 |
| 6,270,111 B1 * | 8/2001 | Hanson et al. ............. 280/650 |
| 6,286,844 B1 * | 9/2001 | Cone et al. .............. 280/47.41 |
| 6,398,233 B1 * | 6/2002 | Liang et al. ................. 280/30 |
| 6,446,990 B1 * | 9/2002 | Nania et al. ........... 280/47.371 |
| 6,513,827 B1 * | 2/2003 | Barenbrug ................. 280/648 |
| 6,641,164 B1 * | 11/2003 | Wood et al. ............... 280/648 |
| 6,702,316 B1 * | 3/2004 | Hsia ........................ 280/648 |
| 6,715,783 B1 * | 4/2004 | Hanson et al. ............. 280/642 |
| 6,863,286 B1 * | 3/2005 | Eros et al. ............... 280/47.38 |
| 6,893,040 B1 * | 5/2005 | Hou et al. ................. 280/642 |
| 6,923,467 B1 * | 8/2005 | Hsia ........................ 280/648 |
| 2003/0111825 A1 * | 6/2003 | Lo et al. .................... 280/648 |
| 2004/0124610 A1 * | 7/2004 | Hou et al. ................. 280/642 |
| 2004/0245747 A1 * | 12/2004 | Hsia ........................ 280/642 |

* cited by examiner

*Primary Examiner*—J. Allen Shriver
(74) *Attorney, Agent, or Firm*—Christie, Parker & Hale, LLP (57) ABSTRACT

A stroller includes two coupling units, each including a coupling member which has opposite first and second coupling portions and which is mounted on a seat supporting bar of a frame so as to be shiftable between a normal position where the first coupling portion faces upwardly, and an alternate position where the second coupling portion faces upwardly. The first and second coupling portions mate with an insertable portion of a seat member. The insertable portion is brought to engage the first coupling portion in the upright direction when the coupling member is in the normal position. The insertable portion is brought to engage the second coupling portion in the upright direction when the coupling member is in the alternate position. A locking member is disposed to releasably retain the coupling member in the normal or alternate position.

13 Claims, 8 Drawing Sheets

STROLLER WITH A DETACHABLE SEAT MEMBER

CROSS-REFERENCE TO RELATED APPLICATION

This application claims priority of Chinese Application No. 200520003600X, filed on Feb. 2, 2005.

BACKGROUND OF THE INVENTION

1. Field of the Invention

This invention relates to a stroller, more particularly to a stroller with two coupling units which permit a seat member, such as a stroller seat, a child vehicle seat, an infant carrycot, or the like, to be detachably mounted on a stroller frame of the stroller.

2. Description of the Related Art

A conventional stroller generally includes a seat which is secured to a stroller frame. Since the seat is not detachable from the frame, such a stroller is not very convenient in use. Hence, another stroller structure is proposed, which includes two adaptors mounted on a frame and spaced apart from each other, and a seat member, e.g. a stroller seat, a child vehicle seat, an infant carrycot, or the like, which is detachably coupled to the adaptors such that the seat member can be detached from the adaptors to be carried alone. Although such a stroller structure can accommodate various types of seat members to meet the user's requirement, the position of the seat member when coupled to the adaptors is fixed, thereby resulting in inconvenience to the user. For example, when an infant carrycot is used as the seat member, it needs to be disposed at a higher position to allow the user to attend to the infant lying in the carrycot with comfort. When a stroller seat is used as the seat member, it needs to be disposed at a lower position for safety purposes.

SUMMARY OF THE INVENTION

The object of the present invention is to provide a stroller which permits a seat member, such as a stroller seat, a child vehicle seat, an infant carrycot, or the like, to be detachably mounted on a frame thereof and in which mounting position of the seat member is adjustable to suit for user's requirement.

According to this invention, the stroller includes front and rear wheels spaced apart from each other in a longitudinal direction, a seat member having two insertable portions which extend in a downward direction and which are spaced apart from each other in a transverse direction relative to the longitudinal direction, a frame including front and rear legs which extend downwards to terminate respectively at front and rear mounts that respectively support the front and rear wheels and that permit the front and rear wheels to be rotatable thereto, and two seat supporting bars which are disposed between the front and rear legs and which are spaced apart from each other in the transverse direction, and two coupling units. Each of the coupling units includes a coupling member which has first and second coupling portions that are opposite to each other, and which is pivotably mounted on a respective one of the seat supporting bars about a pivot axis in the transverse direction. The coupling member is turnable relative to the respective one of the seat supporting bars about the pivot axis between a normal position where the first coupling portion faces upwardly, and an alternate position where the second coupling portion faces upwardly. The first and second coupling portions are configured to mate with a respective one of the insertable portions such that the respective one of the insertable portions is brought to engage the first coupling portion in an upright direction when the coupling member is in the normal position, and such that the respective one of the insertable portions is brought to engage the second coupling portion in the upright direction when the coupling member is in the alternate position. A locking member is disposed to releasably retain the coupling member in one of the normal and alternate positions.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
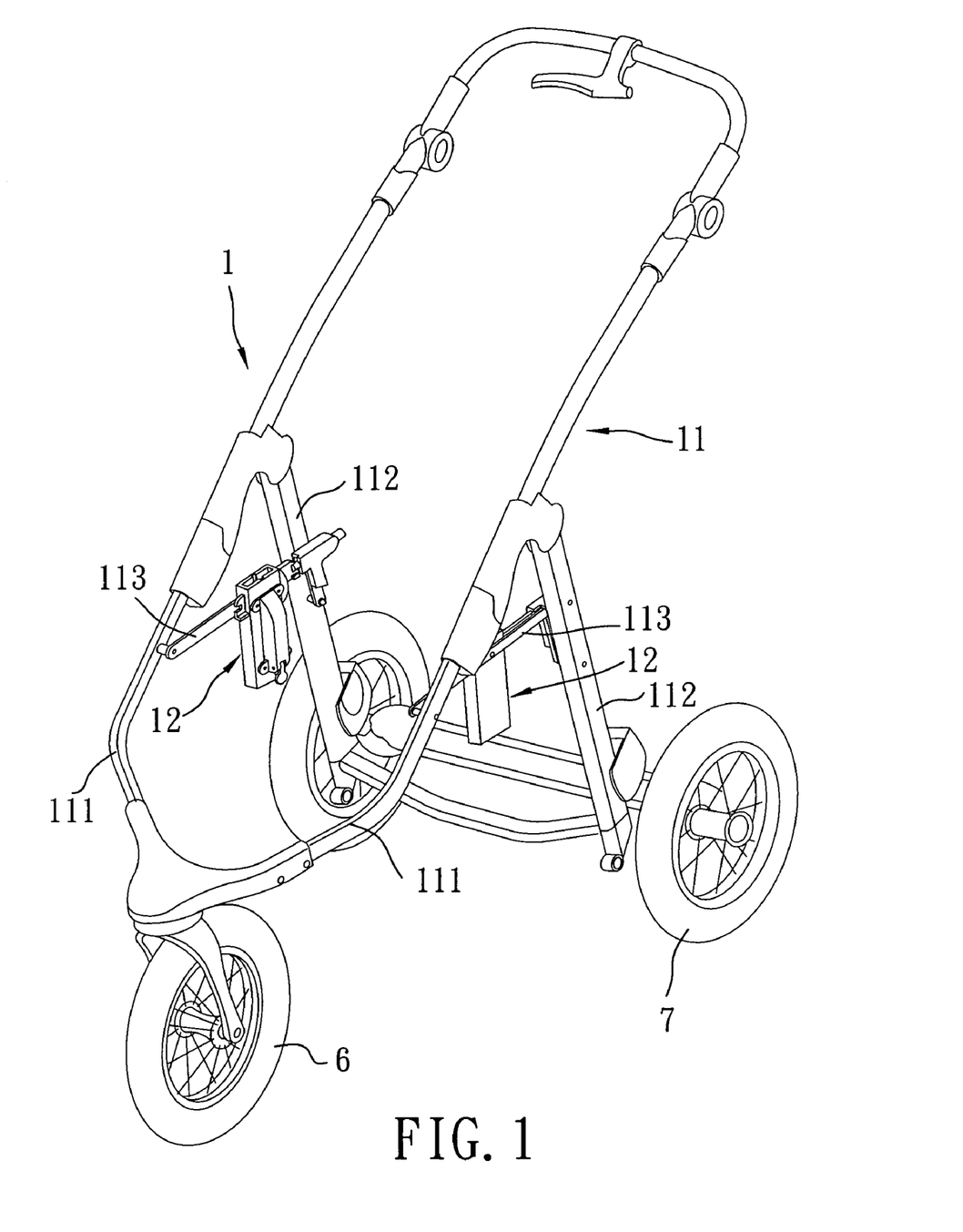
FIG. 1 is a perspective view of the preferred embodiment of a stroller according to this invention, a seat member thereof being removed for the sake of clarity.
Figure 2:
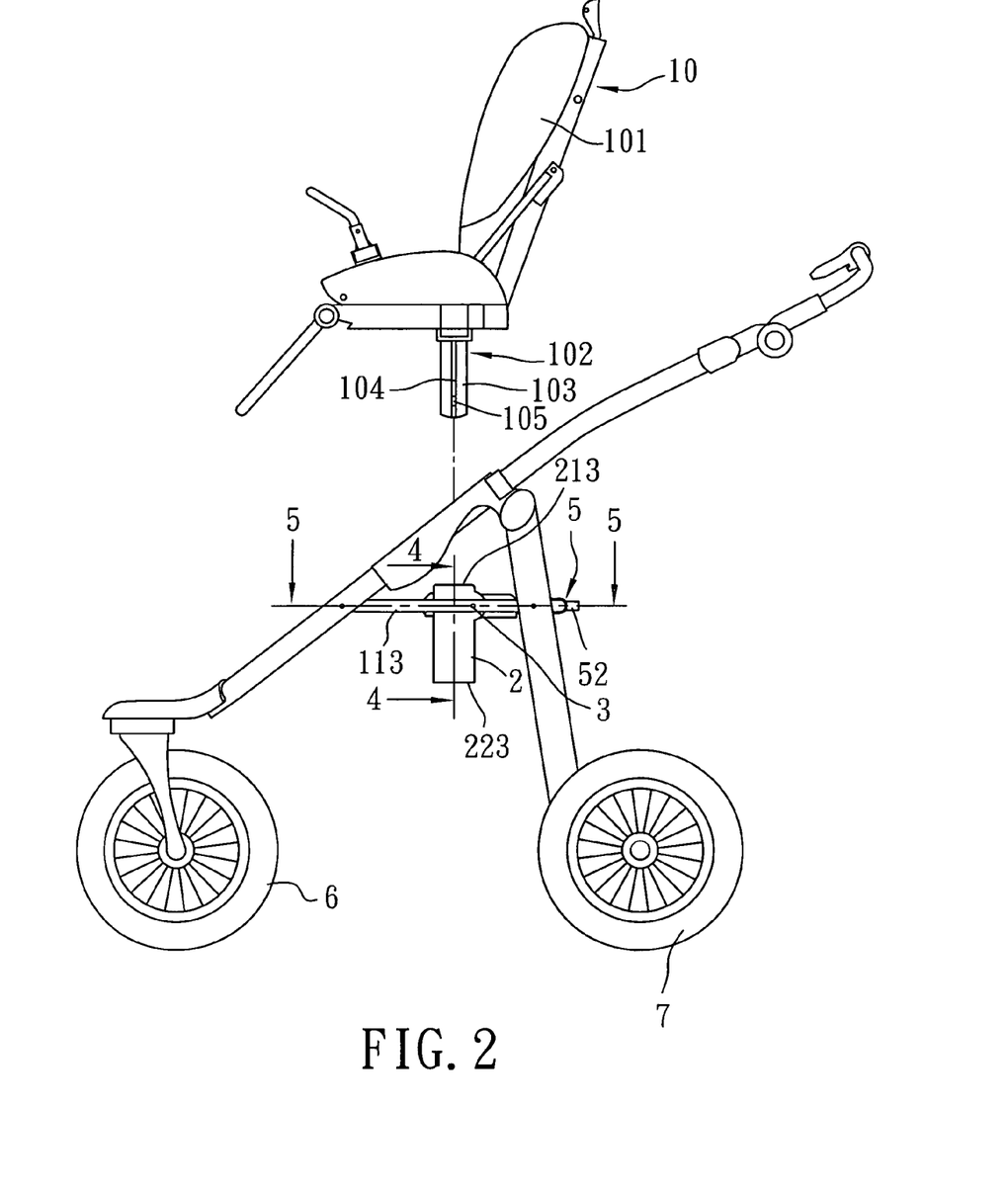
FIG. 2 is a schematic side view of the preferred embodiment in a state where a coupling unit is in a normal position.
Figure 3:
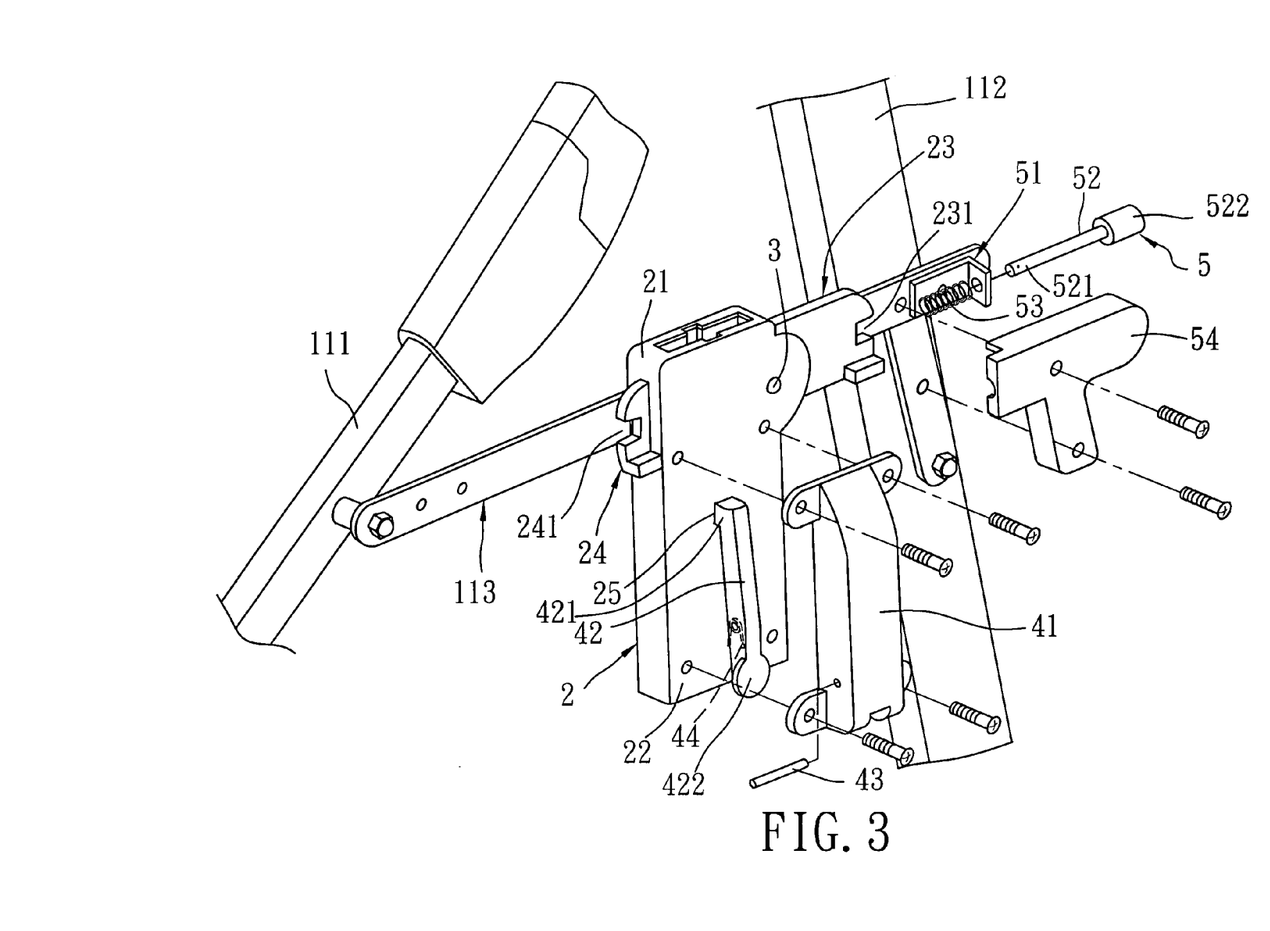
FIG. 3 is a fragmentary exploded perspective view showing the coupling unit of the preferred embodiment in the normal position.

Referring to FIGS. 1 to 3, the preferred embodiment of a stroller 1 according to the present invention is shown to comprise front and rear wheels 6, 7 spaced apart from each other in a longitudinal direction, a frame 11 including front and rear legs 111, 112 which extend downwards to terminate respectively at front and rear mounts that respectively support and that permit the front and rear wheels 6, 7 to be rotatable thereto, a seat member 10, and two coupling units 12.

The frame 11 has two seat supporting bars 113 which are disposed between the front and rear legs 111, 112 and which are spaced apart from each other in a transverse direction relative to the longitudinal direction.

The seat member 10 has a seat body 101 and two insertable portions 102 which extend downwardly from two sides of the seat body 101 in an upright direction transverse to the longitudinal and transverse directions and which are spaced apart from each other in the transverse direction. Each of the insertable portions 102 is in the form of a plug which includes a flat post 103, an elongated protrusion 104 extending along the post 103, and an engaging recess 105 formed in the protrusion 104 and concaved in the transverse direction.

With reference to FIGS. 1 to 4, each of the coupling units 12 includes a coupling member 2 and a locking member 5.

Figure 8:
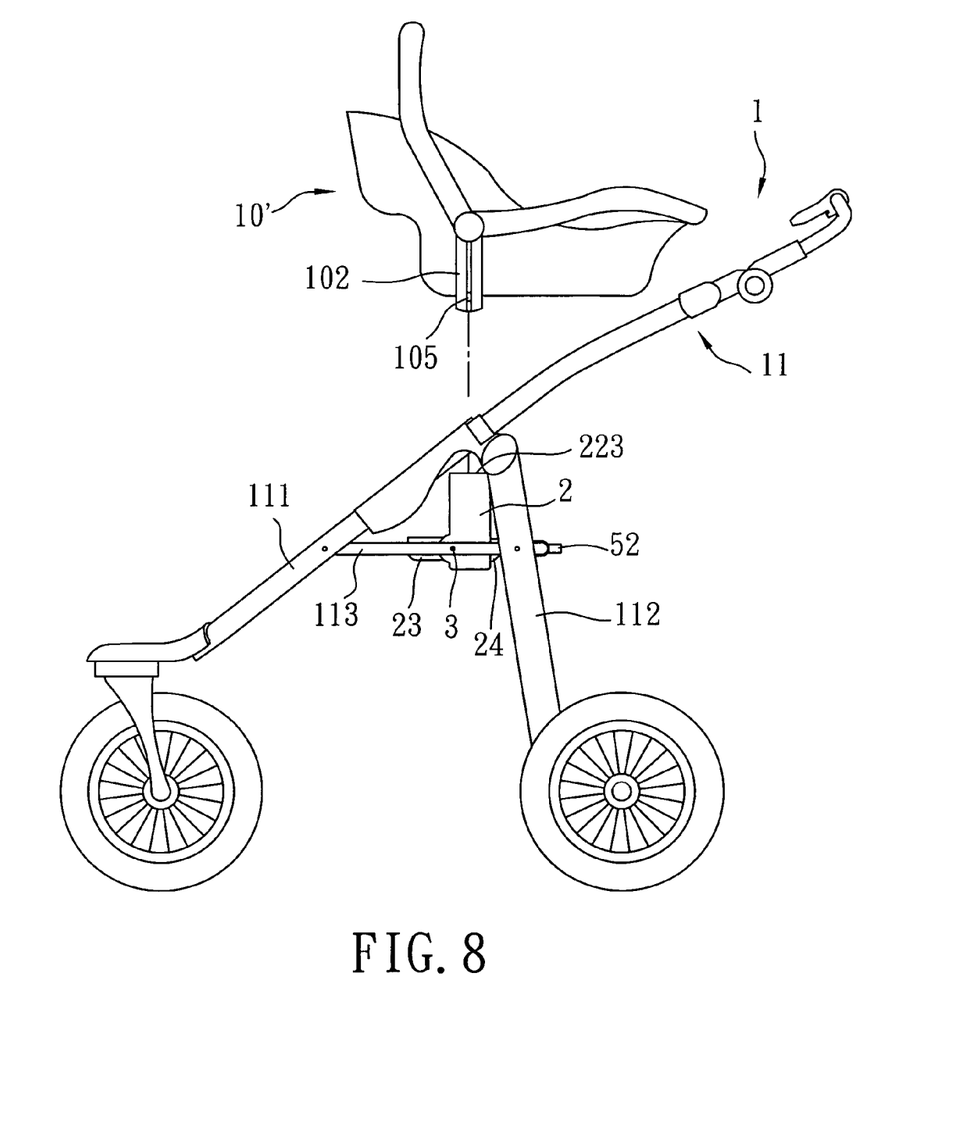
FIG. 8 is a schematic side view of the preferred embodiment in a state where the coupling unit is in the alternate position.

The coupling member 2 has opposite first and second coupling portions 21, 22 which respectively have first and second end surfaces 213, 223 that are opposite to each other and that face in the upright direction when the coupling member 2 is in normal and alternate positions. Each of the first and second coupling portions 21, 22 is in the form of a socket, and includes two walls 211, 221 which extend from the respective one of the first and second end surfaces 213, 223 and which are spaced apart from each other in the transverse direction so as to define a socket slot 212, 222 therebetween that is proximate to the respective one of the first and second end surfaces 213, 223. The socket slots 212, 222 extend to communicate with each other for insertion of a respective one of the insertable portions 102 in the upright direction. The coupling member 2 is pivotably mounted on the respective seat supporting bar 113 about a pivot axis 3 in the transverse direction such that the coupling member 2 is turnable relative to the respective seat supporting bar 113 about the pivot axis 3 between the normal position, as shown in FIG. 2, where the first end surface 213 of the first coupling portion 21 faces upwardly and the second end surface 223 of the second coupling portion 22 faces downwardly, and the alternate position, as shown in FIG. 8, where the second end surface 223 of the second coupling portion 22 faces upwardly and the first end surface 213 of the first coupling portion 21 faces downwardly.

A through hole 25 is formed in one of the walls 211 or 221, and extends in the transverse direction to communicate with the socket slots 212, 222. A lever 42 has a fulcrum disposed on the wall 211 or 221 by means of a pivot pin 43, and engaging and actuated ends 421, 422 disposed on two opposite sides of the fulcrum and outwardly of the wall 211 or 221. The engaging end 421 is disposed to extend through the through hole 25 into the respective socket slot 212, 222 so as to engage the engaging recess 105 in the seat member 10, thereby arresting movement of the insertable portions 102 relative to the respective socket slot 212, 222 once the insertable portions 102 is inserted into the respective socket slot 212, 222. A biasing member 44 is sleeved on the pivot pin 43 to bias the engaging end 421 into the engaging recess 105 such that depression of the actuated end 422 against the biasing action of the biasing member 44 releases the engaging end 421 from the engaging recess 105. A cover 41 is secured on the wall 211, 221 to cover the through hole 25 and the lever 42 except the actuated end 422.

Figure 7:
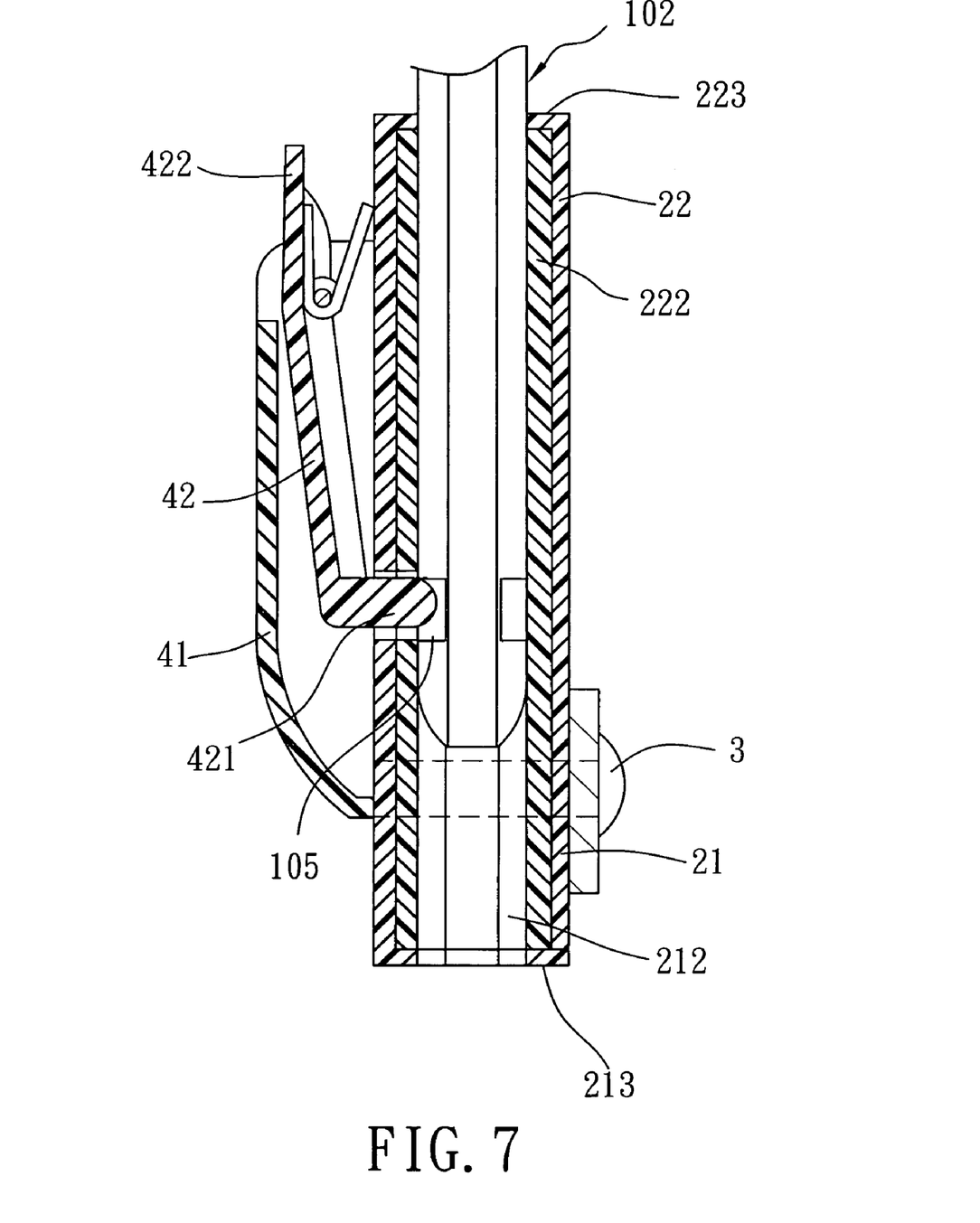
FIG. 7 is a cross-sectional view similar to FIG. 4 but showing the coupling unit in the alternate position.

Moreover, a distance between the first end surface 213 and the pivot axis 3 is smaller than that between the second end surface 223 and the pivot axis 3. Thus, the height of the first end surface 213 relative to the respective seat supporting bar 113 when the coupling member 2 is in the normal position (see FIGS. 2 and 4), is smaller than that of the second end surface 223 when the coupling member 2 is in the alternate position (see FIGS. 7 and 8).

Figure 5:
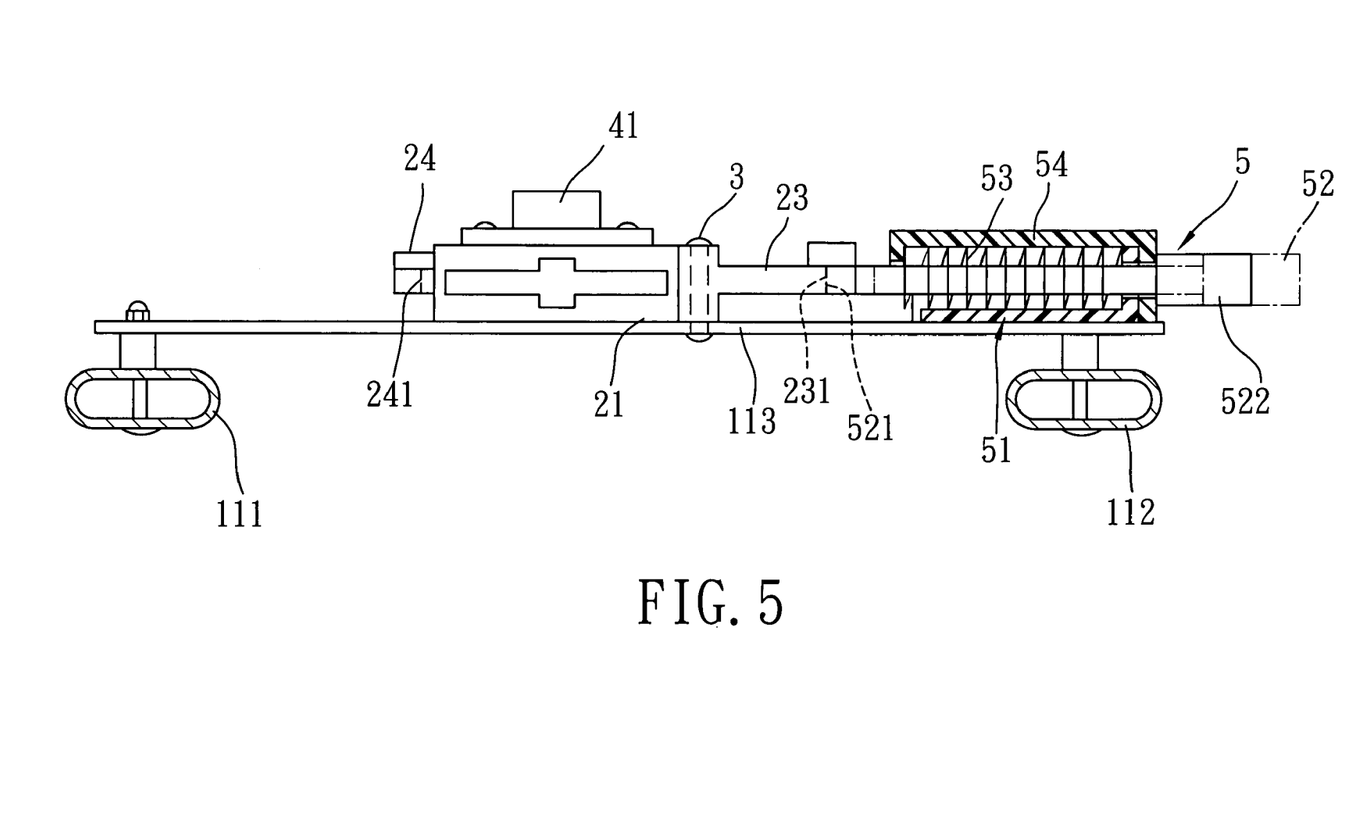
FIG. 5 is a fragmentary cross-sectional view of the coupling unit taken along lines 5—5 of FIG. 2.

With reference to FIGS. 2, 3 and 5, the locking member 5 of each coupling unit 12 includes a retaining shank 52 which is disposed on and which is movable relative to a mount plate 51 secured on the respective seat supporting bar 113 in the longitudinal direction, and which has a retaining end 521 extending toward the coupling member 2, and an operated end 522 opposite to the retaining end 521. Normal and alternate position retaining portions 23, 24 are disposed on the coupling member 2 and opposite to each other in the longitudinal direction, and have retained recesses 231, 241, respectively. The normal and alternate position retaining portions 23, 24 are equi-distant from the pivot axis 3. A biasing member 53 is sleeved on the retaining shank 52 to bias the retaining end 521 of the retaining shank 52 toward the retained recess 231, 241 in the respective one of the normal and alternate position retaining portions 23, 24. A cover 54 is disposed on the respective seat supporting bar 113 to cover the parts of the locking member 5 except the operated end 522.

Figure 4:
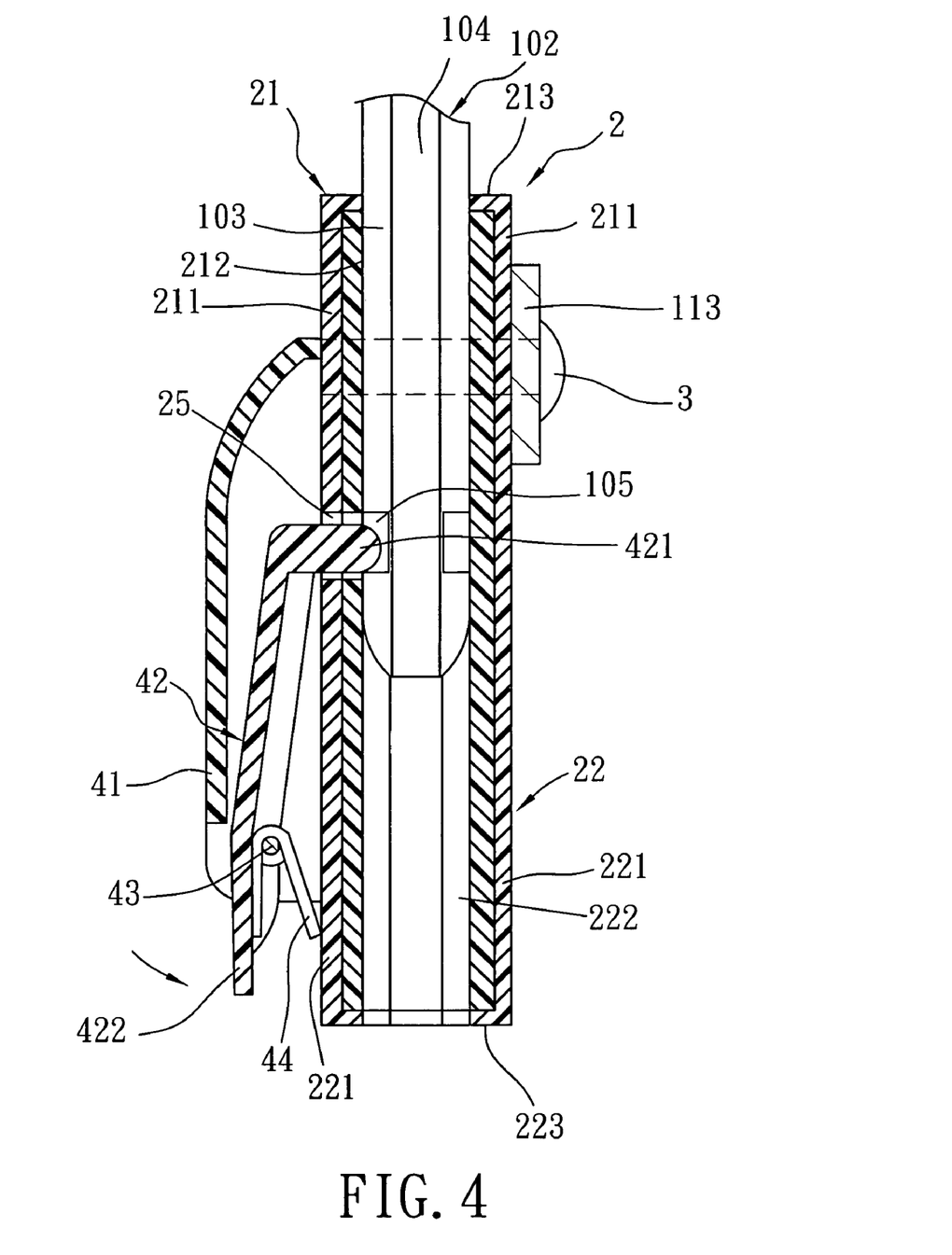
FIG. 4 is fragmentary cross-sectional view of the coupling unit taken along lines 4—4 of FIG. 2.

When the coupling member 2 is placed in the normal position, as shown in FIGS. 2, 4 and 5, the retaining end 521 is moved to engage the retained recess 231 in the normal position retaining portion 23. Each insertable portions 102 of the seat member 10 is inserted into the socket slot 212 in the first coupling portion 21 of the respective coupling member 2 in the upright direction such that the engaging end 421 engages the engaging recess 105 in the seat member 10, thereby arresting movement of the seat member 10 relative to the coupling units 12 and thereby mounting the seat member 10 at a lower position.

Figure 6:
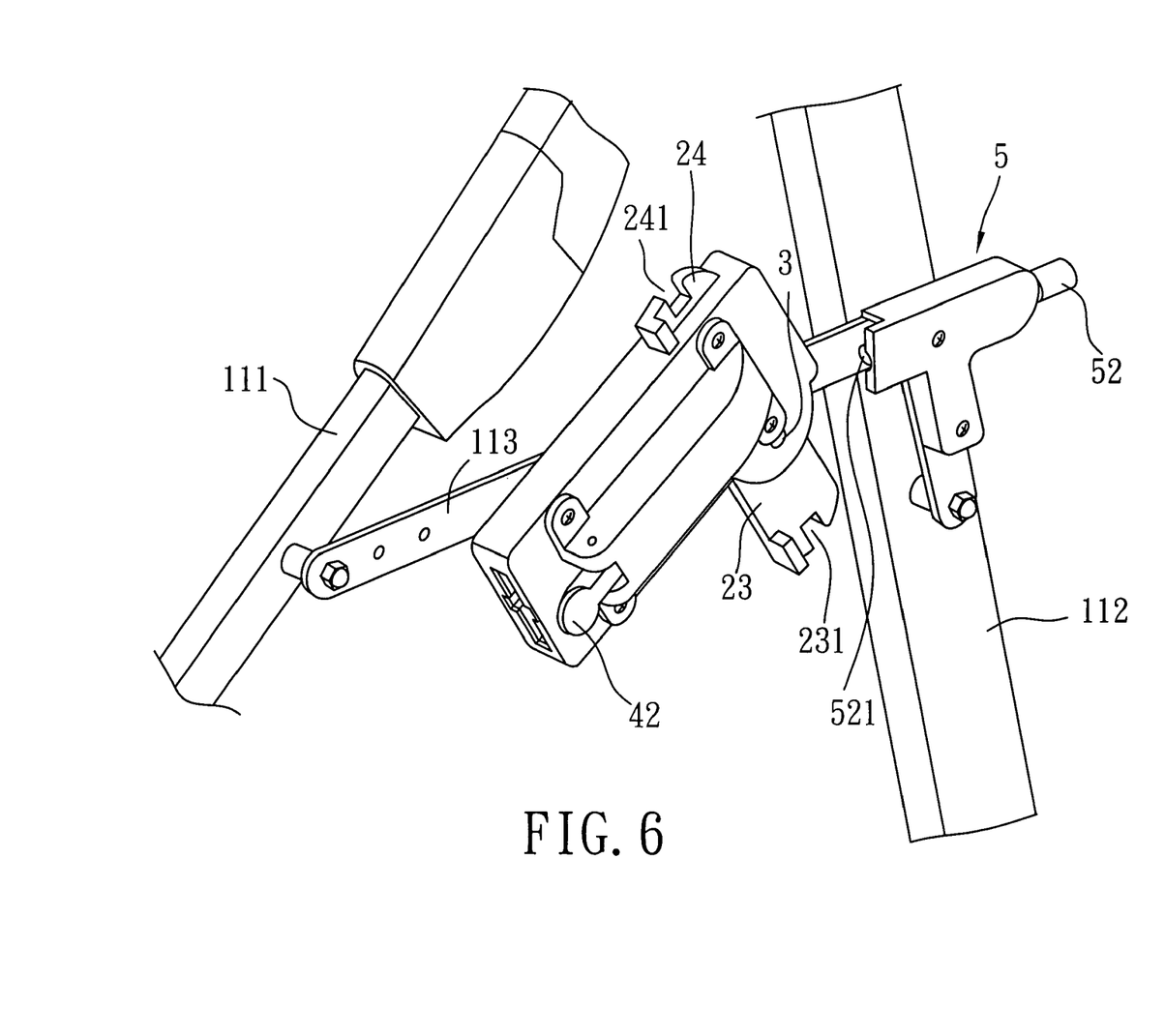
FIG. 6 is a fragmentary perspective view showing that the coupling unit is rotated to an alternate position.

When another seat member 10' is employed in the stroller 1 of this invention, and needs to be mounted at a higher position, the actuated end 422 is depressed to release the engaging end 421 from the seat member 10 so as to permit removal of the insertable portions 102 from the socket slot 212. The operated end 522 is then pulled to permit disengagement of the retaining end 521 from the retained recess 231 (as indicated by dotted lines in FIG. 5) so as to enable the respective coupling member 2 to be rotated to the alternate position, as shown in FIGS. 6 and 8. Once the alternate position retaining portion 24 faces the retaining shank 52, the retaining end 521 can be inserted into the retained recess 241 in the alternate position retaining portion 24. Therefore, each insertable portions 102 of the seat member 10' can be inserted into the socket slot 222 in the second coupling portion 22 of the respective coupling member 2 to permit engagement of the engaging end 421 with the engaging recess 105.

As illustrated, in the stroller 1 of this invention, the seat member 10, 10', be it a stroller seat, a child vehicle seat, an infant carrycot, or the like, can be detachably mounted on the frame 11, and the mounting position of the seat member 10, 10' is adjustable to meet the user's requirement.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A stroller comprising:
   front and rear wheels spaced apart from each other in a longitudinal direction;
   a seat member having two insertable portions which extend in a downward direction and which are spaced apart from each other in a transverse direction relative to the longitudinal direction;
   a frame including front and rear legs which extend downwards to terminate respectively at front and rear mounts that respectively support said front and rear wheels and that permit said front and rear wheels to be rotatable thereto, and two seat supporting bars which are disposed between said front and rear legs and which are spaced apart from each other in the transverse direction; and
   two coupling units, each including
   a coupling member which has first and second coupling portions that are opposite to each other, which is mounted on a respective one of said seat supporting bars, and which is shiftable relative to the respective one of said seat supporting bars between a normal position where said first coupling portion faces upwardly, and an alternate position where said second coupling portion faces upwardly, said first and second coupling portions being configured to mate with a respective one of said insertable portions such that the respective one of said insertable portions is brought to engage said first coupling portion in an upright direction when said coupling member is in the normal position, and such that the respective one of said insertable portions is brought to engage said second coupling portion in the upright direction when said coupling member is in the alternate position, and a locking member which is disposed to releasably retain said coupling member in one of the normal and alternate positions.

2. The stroller of claim 1, wherein said second coupling portion faces downwardly when said coupling member is in the normal position, said first coupling portion facing downwardly when said coupling member is in the alternate position.

3. The stroller of claim 2, wherein said coupling member is pivotably mounted on the respective one of said seat supporting bars about a pivot axis in the transverse direction so as to be turnable relative to the respective one of said seat supporting bars about the pivot axis between the normal position and the alternate position.

4. The stroller of claim 3, wherein said first and second coupling portions respectively have first and second end surfaces which are opposite to each other and which face in the upright direction when said coupling member is in the normal and alternate positions, each of said first and second coupling portions being in form of a socket which includes a socket slot that is formed in a respective one of said first and second end surfaces and that extends towards the other one of said first and second end surfaces, each of said insertable portions being in form of a plug which is configured to be inserted in the upright direction into said socket slot of a respective one of said first and second coupling portions.

5. The stroller of claim 4, wherein said plug has an engaging recess which is concaved in the transverse direction, said socket having two walls which extend from a respective one of said first and second end surfaces and which are spaced apart from each other in the transverse direction so as to define said socket slot therebetween, said socket slot being proximate to a respective one of said first and second end surfaces, one of said walls having a through hole which extends in the transverse direction to communicate with both of said socket slots, and a lever which has an engaging end that is disposed outwardly of said one of said walls and that extends through said through hole into the respective one of said socket slots so as to engage said engaging recess, thereby arresting movement of said plug relative to the respective one of said sockets once said plug is inserted into the respective one of said socket slots.

6. The stroller of claim 5, wherein said lever has an actuated end which is disposed outwardly of said one of said walls, and which is opposite to said engaging end, and a fulcrum disposed on said one of said walls and between said engaging and actuated ends, and a biasing member which is disposed to bias said engaging end into said engaging recess such that depression of said actuated end against biasing action of said biasing member releases said engaging end from said engaging recess.

7. The stroller of claim 5, wherein said socket slots extend to communicate with each other.

8. The stroller of claim 4, wherein a distance between said first end surface and the pivot axis is smaller than that between said second end surface and the pivot axis such that height of said first end surface relative to the respective one of said seat supporting bars when said coupling member is in the normal position is smaller than that of said second end surface when said coupling member is in the alternate position.

9. The stroller of claim 1, wherein said locking member of each of said coupling units includes a retaining shank which is disposed to be movable relative to a respective one of said seat supporting bars in the longitudinal direction and which has a retaining end extending toward said coupling member, and normal and alternate position retaining portions which are disposed on said coupling member and opposite to each other in the longitudinal direction and which have retained recesses that are configured such that when said coupling member is in the normal position, said retaining end is moved to engage said retained recess in said normal position retaining portion, and such that when said coupling member is in the alternate position, said retaining end is moved to engage said retained recess in said alternate position retaining portion.

10. The stroller of claim 9, wherein said locking member includes a biasing spring which is disposed to bias said retaining end of said retaining shank toward said retained recess in a respective one of said normal and alternate position retaining portions.

11. The stroller of claim 3, wherein said locking member of each of said coupling units includes a retaining shank which is disposed to be movable relative to a respective one of said seat supporting bars in the longitudinal direction and which has a retaining end extending toward said coupling member, and normal and alternate position retaining portions which are disposed on said coupling member and opposite to each other in the longitudinal direction and which have retained recesses that are configured such that when said coupling member is in the normal position, said retaining end is moved to engage said retained recess in said normal position retaining portion, and such that when said coupling member is in the alternate position, said retaining end is moved to engage said retained recess in said alternate position retaining portion.

12. The stroller of claim 11, wherein said normal and alternate position retaining portions are equi-distant from the pivot axis.

13. The stroller of claim 11, wherein said locking member includes a biasing spring which is disposed to bias said retaining end of said retaining shank toward said retained recess in a respective one of said normal and alternate position retaining portions.

* * * * *